US012215281B2

(12) United States Patent
Olsson

(10) Patent No.: US 12,215,281 B2
(45) Date of Patent: Feb. 4, 2025

(54) REACTOR WITH SHAFT COOLING

(71) Applicant: Anders Olsson, Esher (GB)

(72) Inventor: Anders Olsson, Esher (GB)

( * ) Notice: Subject to any disclaimer, the term of this patent is extended or adjusted under 35 U.S.C. 154(b) by 193 days.

(21) Appl. No.: 17/792,450

(22) PCT Filed: Jan. 15, 2021

(86) PCT No.: PCT/SE2021/050020
§ 371 (c)(1),
(2) Date: Jul. 13, 2022

(87) PCT Pub. No.: WO2021/145816
PCT Pub. Date: Jul. 22, 2021

(65) Prior Publication Data
US 2023/0044254 A1 Feb. 9, 2023

(30) Foreign Application Priority Data
Jan. 15, 2020 (SE) .................... 2030013-3

(51) Int. Cl.
*C10B 47/24* (2006.01)
*B01J 8/18* (2006.01)
(Continued)

(52) U.S. Cl.
CPC .............. *C10B 47/24* (2013.01); *B01J 8/1836* (2013.01); *B01J 8/24* (2013.01); *C10B 47/44* (2013.01);
(Continued)

(58) Field of Classification Search
CPC ......... C10B 47/24; C10B 47/44; C10B 53/07; C10B 55/10; C10J 3/84; C10J 2300/0946; B01J 8/1836; B01J 8/24
See application file for complete search history.

(56) References Cited

U.S. PATENT DOCUMENTS 3,292,683 A * 12/1966 Buchi ................... B01D 1/223
202/175
5,026,403 A 6/1991 Michel-Kim
(Continued)

FOREIGN PATENT DOCUMENTS

| CN | 101955779 A | 1/2011 |
| JP | 06298994 A | 10/1994 |

(Continued)

OTHER PUBLICATIONS

International Patent Application No. PCT/SE2021/050020, International Search Report, May 25, 2021.
(Continued)

*Primary Examiner* — Jonathan Miller
(74) *Attorney, Agent, or Firm* — Moore & Van Allen PLLC; W. Kevin Ransom

(57) ABSTRACT

Reactor for recovery or recycling of hydrocarbon products from hydrocarbon-containing material by decomposing and gasifying the material in a reactor housing, comprising a gas/particle separator device arranged to separate solid particles accompanying the gas and to return these particles directly to the reactor housing in the opposite direction to axially flowing gasified hydrocarbon products, and/or comprising a rotor shaft with axially running channels which are in flow communication with a coolant, and/or comprising a radial play formed between the periphery of a rotor and the inside of the reactor housing and amounting to at least 3 cm and at most 6 cm.

8 Claims, 2 Drawing Sheets

(51) Int. Cl.
*B01J 8/24* (2006.01)
*C10B 47/44* (2006.01)
*C10B 53/07* (2006.01)
*C10B 55/10* (2006.01)
*C10J 3/84* (2006.01)

(52) U.S. Cl.
CPC .............. *C10B 53/07* (2013.01); *C10B 55/10* (2013.01); *C10J 3/84* (2013.01); *C10J 2300/0946* (2013.01)

(56) References Cited

U.S. PATENT DOCUMENTS

| | | | | |
|---|---|---|---|---|
| 5,607,558 | A * | 3/1997 | Ellingsen | B01D 3/08 159/6.3 |
| 5,697,168 | A * | 12/1997 | Matthys | F26B 17/20 110/224 |
| 6,165,349 | A * | 12/2000 | Madar | C10B 53/07 208/55 |
| 8,444,828 | B2 * | 5/2013 | Wolfe | F23G 5/0273 201/15 |
| 9,045,693 | B2 * | 6/2015 | Wolfe | F23G 5/0273 |
| 9,180,425 | B2 * | 11/2015 | Olsson | B01J 19/1806 |
| 9,387,423 | B2 * | 7/2016 | Olsson | B02C 13/288 |
| 9,677,017 | B2 * | 6/2017 | Olsson | B02C 13/16 |
| 9,994,784 | B2 * | 6/2018 | Chataing | C10B 53/02 |
| 11,319,218 | B2 * | 5/2022 | Riley | B01D 1/0082 |
| 11,667,543 | B2 * | 6/2023 | Riley | B01D 1/225 202/175 |
| 2004/0144405 | A1 * | 7/2004 | Garrick | B01D 17/00 134/25.1 |
| 2011/0094940 | A1 * | 4/2011 | Weisselberg | C10G 1/00 208/390 |
| 2012/0321531 | A1 * | 12/2012 | Olsson | B01F 27/70 422/225 |
| 2015/0252273 | A1 * | 9/2015 | Olsson | F23G 5/0276 422/204 |
| 2015/0343357 | A1 * | 12/2015 | Olsson | B01D 45/14 422/187 |
| 2021/0039964 | A1 * | 2/2021 | Riley | C02F 1/048 |
| 2022/0135436 | A1 * | 5/2022 | Riley | C02F 1/048 203/11 |

FOREIGN PATENT DOCUMENTS

| | | |
|---|---|---|
| SE | 534399 C2 | 8/2011 |
| SE | 536795 C2 | 8/2014 |
| SE | 537075 C2 | 12/2014 |
| WO | 9408680 A1 | 4/1994 |
| WO | 9839368 A1 | 9/1998 |
| WO | 02088506 A2 | 11/2002 |
| WO | 2011078779 A1 | 6/2011 |
| WO | 2014051514 A1 | 4/2014 |
| WO | 2014098746 A1 | 6/2014 |
| WO | 2014098747 A1 | 6/2014 |

OTHER PUBLICATIONS

International Patent Application No. PCT/SE2021/050020, Written Opinion, May 25, 2021.

* cited by examiner

Radial distance reactor wall – hammer [mm]

REACTOR WITH SHAFT COOLING

CROSS REFERENCE TO RELATED APPLICATIONS

This application is a National Stage Patent Application (filed under 35 § U.S.C. 371) of PCT/SE2021/050020, filed Jan. 15, 2021, which, in turn claims priority to Swedish Patent Application No. 2030013-3 filed Jan. 15, 2020; the contents of each of which are hereby incorporated by reference.

TECHNICAL FIELD OF THE INVENTION

The invention relates to an apparatus and a method for recovering or recycling hydrocarbon products from hydrocarbon-containing materials using a reactor arranged for agitation and grinding of the material during the development of heat in the material and for gasification of hydrocarbon products contained in the material.

Background and Prior Art

Devices and methods for this purpose are previously described in the patent literature, see for example patents SE 537 075 C2, SE 536 795 C2, SE 534 399 C2 and PCT publication no. WO 2014/098746 A1. In this context, U.S. Pat. No. 6,165,349 A should also be mentioned.

As the process is mainly known by disclosures in previous patents, only a summary will be given here of the working principle of a reactor set up for agitation or grinding of hydrocarbon-containing materials during the development of heat in and for gasification of hydrocarbon products contained in the material.

Process material is fed to a reactor housing, which material can be in the form of plastic or rubber waste, other hydrocarbon-based waste products or hydrocarbon-contaminated soil or sand for grinding, atomizing and agitation and by means of a rotor rotating in the reactor housing. The material decomposes by the kinetic energy developed by the rotor, whereby longer hydrocarbon chains and larger hydrocarbon molecules in the process material are broken by the agitation of the rotor and by the frictional heat generated between the particles in the atomized and swirling material. Where appropriate, inorganic material such as sand, glass or metal powder can be fed into the reactor housing to increase friction and raise the temperature. Hydrocarbon compounds, water and other organic matter are gasified, whereby gas and solid fractions are separated by the centrifugal force generated by the rotor so that gas can be discharged from a central part of the reactor housing while residual solids can be discharged from a peripheral part of the reactor housing.

SUMMARY OF THE INVENTION

An overall problem in this context is that the finest and lightest particles of solid material are not affected by the centrifugal forces in the reactor housing to a sufficient extent for them to be separated from the gas. These light particles therefore accompany the gas out of the reactor housing and risk creating deposits in pipelines that lead the gas from the reactor to a downstream plant for condensation, distillation, combustion or other post-treatment of the gas.

An attempt to solve this problem is described in SE 537 075 C2. The solution comprises a number of blades mounted on the drive shaft of the reactor rotor for rotation with the shaft. The blades are mounted inside the reactor housing, in front of and upstream of an inlet to a radially directed gas outlet duct. The blades are directed to counteract the direction of movement of the particles as the shaft rotates and thereby throw them back towards the rotor and the central part of the reactor housing. Under certain conditions, this solution may have a disadvantage in that the rotational speed of the blades, which is the same as that of the rotor and may be in the order of 400-600 rpm, is insufficient to brake the solid particles and separate them from the gas. In addition, since the blades generate a radially directed component of movement, some of the solid material risks being driven towards the radially directed gas outlet instead.

An object of the invention is to provide a solution to this problem.

This object is achieved in that the invention provides a reactor for recovering or recycling hydrocarbon products from hydrocarbon-containing materials, comprising a cylindrical reactor housing extending axially between a first/rear end wall and a second/front end wall, a rotor rotatably arranged in the reactor housing which is driven for rotation by means of a motor and a rotor shaft coaxially aligned with the reactor housing extending into the reactor housing through the first/rear end wall, to which reactor housing process material is fed radially or axially via an inlet to the reactor housing, gasified hydrocarbon products are discharged axially via a reactor gas outlet opening centrally in the second/front end wall, and residual solid process material is discharged via a residual material outlet opening peripherally in the reactor housing, wherein at the reactor gas outlet a gas/particle separator device is arranged on the outside of the reactor housing which is arranged to separate solid particles accompanying the gas and to return these particles directly to the reactor housing in the opposite direction to the axially outflowing gas.

In a preferred embodiment the solution has a cylindrical pipe connected to the reactor gas outlet and axially aligned with the reactor housing, which pipe at a first end is open towards the reactor housing and at a second end, facing away from the reactor housing, has an outlet, radially opening into the pipe wall, for the gas flowing in the pipe, a rotatable feed screw arranged coaxially in the pipe, the pitch and direction of rotation of which produces transport of solid particles in the direction of the reactor housing, and a motor arranged at the other end of the pipe for rotation of the feed screw at a speed which causes solid particles to be thrown outwardly towards the pipe wall.

The embodiment provides an advantage and technical effect consisting in that the feed screw like an impeller can be driven at a significantly higher rotational speed than the rotor/rotor shaft, and in an advantageous variant of the solution the feed screw is therefore driven by an electric motor to a rotation of the order of 2500-3500 rpm.

The high rotational speed results in solid particles flowing with the gas being thrown outwards in the direction of the pipe wall, whereupon they are transported back to the reactor housing by the action of a peripheral part of the helical blade of the feed screw.

To prevent the returned particles from immediately moving into the outflowing gas flow, it is preferred that the feed screw extends through the reactor gas outlet some distance into the reactor housing, to a length of preferably 10 to 40 mm, whereby a radial component of movement assigned by the feed screw throws the particles outwards from the central part of the reactor housing.

It is further preferred that the pipe has a length between its open end and the outlet of the pipe, which length is so determined that the solid particles accompanying the gas from the reactor housing are separated by the centrifugal force generated by the feed screw before the gas cleaned from particles flows out through the pipe outlet, driven by the pressure difference between the reactor housing and a transport line connected to the pipe outlet. In addition, it may be preferable to arrange, in the gas flow between the gas/particle separator device and a post-treatment device, a pressure lowering means, such as a Venturi nozzle, to amplify the pressure difference between the reactor housing and the post-treatment device.

A partial problem in this context is that the process temperature in the reactor housing, which may amount to the order of about 500° C., propagates in the rotor shaft and risks affecting shaft bearings and shaft seals in the reactor.

Another object of the invention is to provide a solution to this problem.

This object is achieved in that the invention provides a reactor for recovering or recycling hydrocarbon products from hydrocarbon-containing materials, comprising a cylindrical reactor housing extending axially between a first/rear end wall and a second/front end wall, a rotor rotatably arranged in the reactor housing which is driven for rotation by means of a motor and a rotor shaft coaxially aligned with the reactor housing extending into the reactor housing through the first/rear end wall, to which reactor housing process material is fed radially or axially via an inlet to the reactor housing, gasified hydrocarbon products are discharged axially via a reactor gas outlet opening out centrally in the second/front end wall, and remaining solid process material is discharged via a residual material outlet opening peripherally in the reactor housing, wherein at least a portion of the rotor shaft between the motor and the rotor is formed with channels running in the longitudinal direction of the rotor shaft which are in flow communication with a coolant.

A preferred embodiment of this solution comprises inlet and return flow channels running in parallel in the rotor shaft, which are individually in flow communication with a coolant supply and a coolant drainage, respectively, arranged in a swivel rotatably mounted on the rotor shaft. Accordingly, a coolant circulation is hereby provided in the rotor shaft which ensures high cooling effect.

The swivel may be supported on a free end of the rotor shaft protruding from a gear housing, wherein the cooling channels in the rotor shaft may extend from said free end to the region of insertion of the rotor shaft through the rear end wall of the reactor housing. More specifically, the cooling channels in the rotor shaft may have sufficient extent to achieve cooling of a region of the rotor shaft which is sealed against the environment at the insertion of the rotor shaft through the rear end wall of the reactor housing. This seal suitably comprises an active sealing box to which a fluid is fed at a higher pressure than the prevailing pressure in the reactor housing.

It is preferred that the cooling channels in the rotor shaft extend for cooling at least a region or length of the rotor shaft which is rotatably journaled and supported in a reactor stand.

Another partial problem in this context is that unwanted hard objects in the process material not only risk damaging the rotor and reactor housing, but can also disturb the formation of the fluidized state of the process material which is a condition for stratification and separation between solid material, fluid and gas in the reactor housing.

It is another object of the invention to provide a solution to this problem.

This object is achieved in that the invention provides a reactor for recovering or recycling hydrocarbon products from hydrocarbon-containing materials, comprising a cylindrical reactor housing extending axially between a first/rear end wall and a second/front end wall, a rotor rotatably arranged in the reactor housing which is driven for rotation by means of a motor and a rotor shaft coaxially aligned with the reactor housing extending into the reactor housing through the first/rear end wall, to which reactor housing process material is fed radially or axially via an inlet to the reactor housing, gasified hydrocarbon products are discharged axially via a reactor gas outlet opening out centrally in the second/front end wall, and residual solid process material is discharged via a residual material outlet opening peripherally in the reactor housing, wherein a radial clearance (or play) of 2-8 cm, preferably at least 3 cm and at most 6 cm, being formed between the periphery of the rotor and the inside of the reactor housing.

In this way, a peripheral zone is created, where harder and non-degradable objects may be discharged and from which they can not affect and disturb the fluidized bed-like flow conditions which are to produce a radial stratification and separation of gas from solid particles in the reactor housing.

The rotor comprises rotor arms extending radially from the rotor shaft with hammers pivotally journaled in the outer ends of the rotor arms, which during the rotation of the rotor can pivot between a retracted position towards the rotor arm and a substantially radially outwardly extended position away from the rotor arm, wherein the length of the rotor arm is dimensioned so that in the extended position of the hammer, a radial distance of 3-6 cm remains between the hammer and the inside of the reactor housing.

The rotor comprises rotor arms distributed one after the other in a helical formation along the rotor shaft, resulting in a surrounding and substantially tubular agitated layer of non-fluidized finely ground particulate material between the rotor and the inside of the reactor housing. Thus, at the inside of the reactor housing, a substantially cylinder-shaped mass of finely divided particles is formed, which protects the reactor housing/reactor chamber against wear as well as increases the efficiency of the process.

In another aspect of the invention, the object is achieved by a method for recovering or recycling hydrocarbon products from hydrocarbon-containing materials using a reactor of the above kind, which method comprises generating and maintaining an agitated layer of non-fluidized finely ground material surrounding the reactor rotor with a radial extension of at least 3 cm and not more than 6 cm, between the rotor and the inside of the reactor housing. More specifically, in one embodiment of the method, a rotor with a helical structure is provided by rotor arms distributed one after the other in a helical formation along a rotor shaft. The rotor is driven in rotation in order to generate and maintain, by means of the rotor arm tips evenly distributed over the periphery of the rotor, a particle layer of an essentially homogeneous radial depth surrounding the rotor.

It should be clarified here that by fluidized material in a fluidized bed is meant in this context a volume in which solid particles move substantially frictionlessly in a flowing gas or liquid. On the contrary, in the current surrounding outer layer of the reactor housing there is a non-fluidized state in which particles of solid material are worn against each other and heat is generated by friction between solid material particles.

It should be further clarified that even if the rotor rotates mainly inside the surrounding layer, a desired stirring and agitation takes place at depth by shear forces and turbulence generated by the tangential velocity $V_1$ of the rotor arm tips (see FIG. 2) at the interface to the surrounding layer.

The advantages and technical effects provided by the generation and maintenance of a surrounding agitated layer of non-fluidized finely ground material between the rotor and the inside of the reactor housing, include recovery of energy supplied mechanically to the process via the rotor. This energy is converted into heat which is largely generated by friction between the finely-divided particles in the surrounding layer, and contributes to the thermal decomposition of molecular chains and larger molecules in the hydrocarbon-containing process material. More specifically, the particles consist mainly of carbon remaining from hydrocarbon formations in the depolymerization of hydrocarbon chains in plastic, rubber, oil and other hydrocarbon-containing material. In the surrounding layer, the particles are worn against each other and are ground so that they are atomized down to a size of a few thousandths of a millimeter (approximately 1-50 μm), which results in a very large accumulated heat transfer surface and by that associated high efficiency.

The specified range of 3 to 6 cm has been determined by studies and measurements of pressure, force and flow conditions in the reactor. These studies include computer simulation in the form of Computational Fluid Dynamics (CFD) analysis. With knowledge of conditions prevailing in the reactor housing in simulated operation of the reactor, taking into account radially distinguishable pressure zones and volume fractions of carbon particles, as well as shear forces generated by the rotor arms, it has been found that the specified range is a particularly favorable combination of static pressure, particle size and influence/agitation from the rotor, for the reactor according to the invention.

It has thus been found that at a layer thickness of more than about 6 cm the risk of insufficient agitation in the outermost part of the layer at the reactor housing wall increases, since the static pressure in the particle layer is typically significantly higher next to the reactor housing wall than in the interface at the rotor periphery. At a layer thickness of less than about 3 cm, on the other hand, the potential energy recovery that may be achieved through the surrounding layer is not utilized. Thus, on both sides of the specified range, efficiency is lost.

BRIEF DESCRIPTION OF THE DRAWINGS

Exemplary embodiments of the invention are described in more detail below with reference to the accompanying schematic drawings, of which

DETAILED DESCRIPTION OF PREFERRED EMBODIMENTS

Figure 1:
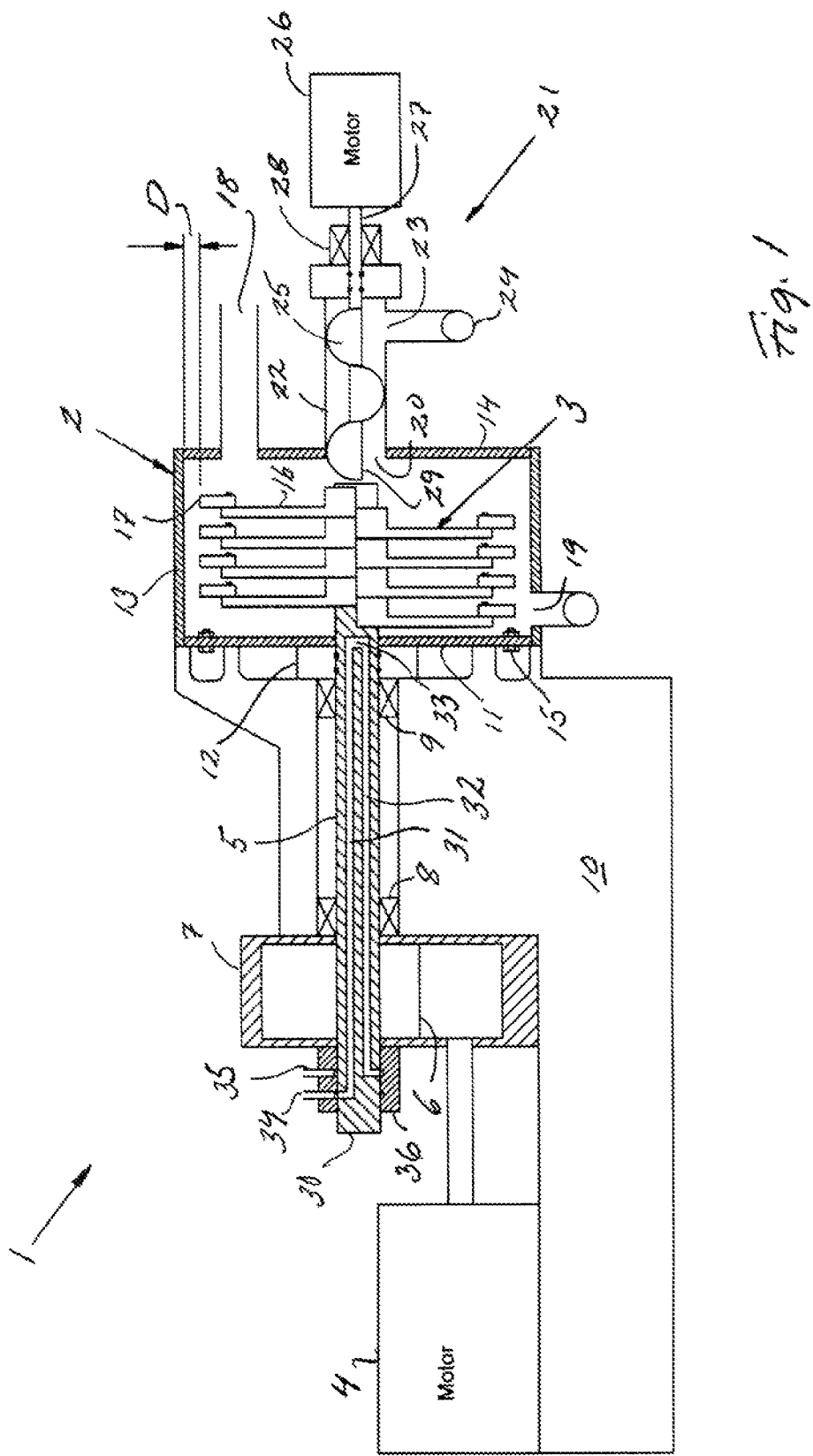
FIG. 1 shows a longitudinal section through a reactor.

A reactor 1 comprises a rotor 3 rotatably arranged in a cylindrical reactor housing 2. The rotor 3 is driven in rotation by a motor 4 via a rotor shaft 5. The motor 4 may be driven electrically, with diesel, or petrol, or with another energy source. The motor speed can be reduced by a gear 6 in a gear housing 7 to a rotor speed suitable for the reactor. A suitable rotor speed can typically be in the order of 400 to 600 revolutions per minute. By means of two bearing sets 8 and 9, respectively, the rotor shaft 5 is radially and axially mounted in a reactor stand 10. From its journaling in the reactor stand, the rotor shaft 5 extends cantilevered into the reactor housing 2 via a centrally located bushing in a first/rear end wall 11 of the reactor housing. The rotor shaft 5 and the rotor 3 are hereby coaxially aligned with the reactor housing 2.

The insertion of the rotor shaft through the end wall 11 is sealed to the surroundings by means of a sealing box 12 with seals which are in contact with the rotor shaft 5. The sealing box 12 may be of the active type to which a fluid, for example nitrogen gas or other inert medium, is fed, at a pressure higher than the prevailing pressure in the reactor housing, during operation, to counteract leakage of gasified hydrocarbon products out of the reactor housing, along the rotor shaft.

The reactor housing 2 comprises a cylindrical housing 13 which extends axially between the first/rear end wall 11 and a second/front end wall 14. The reactor housing is supported in the reactor by the first/rear end wall 11 being fixedly connected to the reactor stand 10, for example by means of a bolted joint 15.

Figure 3:
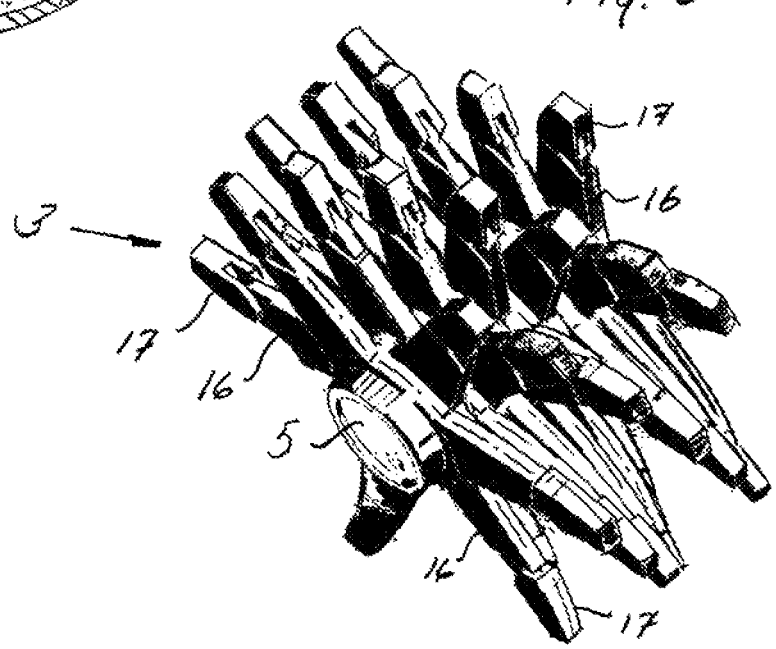
FIG. 3 shows an embodiment of a rotor in perspective.

The rotor 3 comprises a number of rotor arms 16 which are rigidly mounted on the rotor shaft and extend radially therefrom. At their outer ends, the rotor arms support an articulately arranged rotor arm tip or hammer 17. The rotor arms 16 may be distributed around the rotor shaft in groups of, for example, three, following one another in a number of mutually offset turns so that the rotor has a helical structure, see FIG. 3. This structure means that the rotor arm tips or hammers 17 are distributed evenly over the periphery of the rotor in both the axial direction and in the circumferential direction.

Figure 2:
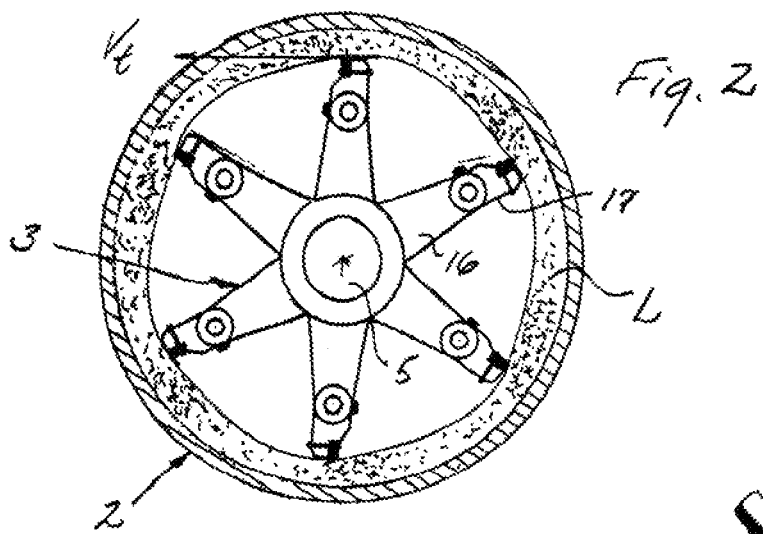
FIG. 2 shows a broken-away cross section through a reactor housing with rotor.
Figure 4:
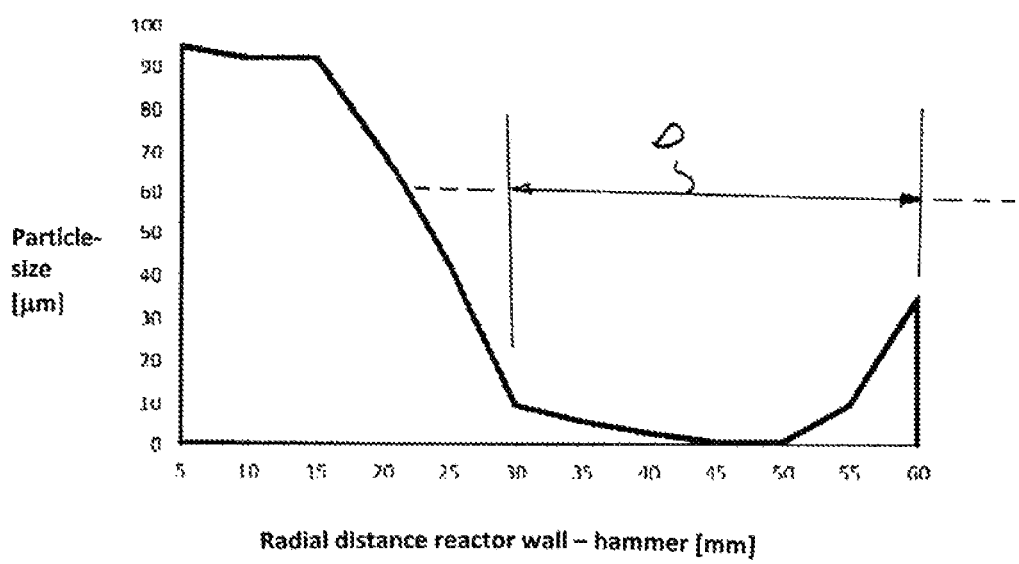
FIG. 4 is a diagram showing size distribution of solid particles in a peripheral area of the reactor housing surrounding the rotor

For reasons already explained above, the housing 13 and rotor 3 of the reactor housing 2 are dimensioned with respect to their radii so that a free space/an annular volume is formed between them and a circumferential gap D having a radial depth of at least about 3 cm and at most about 6 cm from the inside of the reactor housing. As a result, during the operation of the reactor, a substantially cylindrical layer L of solid particles is formed outside the rotor, see FIG. 2. The rotor's high tangential velocity $V_1$, which may be in the order of 30-40 m/s, causes a strong agitation and stirring in the inner interface of the layer L. In this region an efficient mechanical decomposition and grinding/atomization of solid material down to a minimum particle size in the order of a few thousandths of a millimeter is achieved. How the particle size is distributed in the layer L is illustrated by the diagram in FIG. 4 which indicates a concentrated presence of the finest particles in the range of about 30 mm to about 60 mm. During operation, process material may be fed into the reactor housing via a radially opening inlet through the cylindrical casing of the reactor housing (not shown), or as in the exemplary embodiment via an axially opening process material inlet 18 accommodated in the front end wall 14. After processing in the reactor housing material, residual process material, i.e. non-gasified material, is discharged via a residual material outlet opening out peripherally into the reactor housing, and is transported therefrom further through a tangentially connecting transport pipe 19.

Hydrocarbons gasified in the process are discharged in the axial direction via an axially opening reactor gas outlet 20 centrally located in the front end wall 14. This solution is facilitated by the rotor shaft 5 extending self-supportingly into the reactor housing without the need for support from the front end wall 14. The solution also implies that the rotor 3 may be extended backwards to utilize the entire length of the reactor housing up to the rear end wall 11, since the partition inside the reactor housing required in previous prior art solutions to separate a gas outlet located there from the process in the reactor housing, can now be avoided. This solution thus provides a larger efficient process volume in the reactor housing or chamber and the load on the shaft 5 and the bearings 8, 9 becomes more favorable as the load is centered closer to the suspension in the bearings 8, 9.

Connected to the front end wall is a gas/particle separator device 21 which is arranged to separate the solid particles accompanying the gas from the reactor housing and to return them directly to the reactor housing in the opposite direction to the axially outflowing gas.

The gas/particle separator device 21 consists of a cylindrical pipe 22 open towards the reactor gas outlet 20. In an opposite front end, facing away from the reactor housing, an outlet 23 for gas flowing through the tube is accommodated. The outlet 23 of the pipe opens substantially radially into the pipe wall and may via a transport line 24 be in flow connection with a downstream post-treatment device (not shown). In the pipe 22 a feed screw 25 is arranged and drivable for rotation by means of a motor, such as an electric motor 26. A drive shaft 27 extends from the motor 26 through a sealed bearing housing 28 connected to the front end of the tube 22. As indicated above, the post-treatment device may, for example, be in the form of a condensing unit, distillation unit or a combustion unit. The feed screw 25 has a helically rotated blade and is driven by the motor 26 to return solid material particles entering the tube 22 to the reactor housing. The feed screw 25 is driven at high speed, preferably in the order of 2500-3500 rpm, to effect a radial layering and separation of solid particles and gas by centrifugal action before the gas reaches the outlet 23 in the pipe wall. The transport of the gas through the pipe 22 is promoted by the relative negative pressure prevailing in the transport line 24.

A free end 29 of the feed screw 25 extends past the open end of the pipe to reach, via the reactor gas outlet 20, a distance into the reactor housing, such as 10-40 mm. The design is made possible by the rotor shaft 5 extending cantilevered into the reactor housing, operatively supported by the reactor stand 10 and journaled by the two bearing sets 8 and 9 located outside the reactor housing. In this preferred embodiment, the feed screw may throw the returned solid particles radially outwards in front of the rotor (seen in a direction from rotor 3 to motor 4). Thus, the particles are returned to the process some distance outside the rotor shaft and are prevented from returning directly with the gas stream out of the reactor housing.

From a free end 30 of the rotor shaft 5 protruding from the gear housing 7, inside the rotor shaft, a pair of longitudinally parallel channels 31 and 32 are extending, which are interconnected through a transition 33 in a front region of the rotor shaft. The channels 31 and 32 extend in the longitudinal direction up to or slightly past the part of the rotor shaft surrounded by the sealing box 12. It also follows that the cooling channels extend for cooling the rotor shaft in the part thereof which is journaled and supported in the reactor stand. At the opposite end, the channels 31 and 32 are in flow communication with a coolant which can circulate through the channels for cooling the rotor shaft. The channels 31 and 32 serve as supply and return flow channels for coolant from/to a coolant supply, respectively, and are individually in flow communication with a coolant supply 34 and a coolant drainage 35, respectively, arranged in a swivel 36 rotatably supported on the rotor shaft.

The cooling contributes to a lower temperature in the rotor shaft at the sealing box 12 and at the bearings 8, 9, which increases the service life of these components and provides a better economy and operational reliability compared with known technology.

The invention is of course not limited to the embodiments described above but can be varied within the scope of the appended claims.

The invention claimed is:

1. A reactor for recovering or recycling of hydrocarbon products from hydrocarbon-containing materials, comprising:
   a cylindrical reactor housing extending axially between a rear end wall and a front end wall;
   a rotor rotatably arranged in the reactor housing and driven in rotation by means of a motor and a rotor shaft coaxially aligned with the reactor housing, wherein the rotor has rotor arms extending radially from the rotor shaft, wherein each rotor arm comprises a hammer pivotally journaled in an outer end of the rotor arm, wherein the rotor shaft is journalled in a reactor stand and extending cantilevered through the rear end wall of the cylindrical reactor housing with no support from the front end wall of the reactor housing;
   an inlet to the reactor housing through which process material is fed radially or axially into the reactor housing;
   a reactor gas outlet opening out centrally in the front end wall through which gasified hydrocarbon products are discharged axially from the reactor housing; and
   a residual material outlet opening out peripherally in the reactor housing through which residual solid process material is discharged from the reactor housing,
   wherein at least a portion of the rotor shaft between the motor and the rotor is formed with channels running in the longitudinal direction of the rotor shaft, said channels being in flow communication with a coolant, via inflow and return flow channels running in parallel in the rotor shaft, the channels being individually in flow communication with a coolant supply and a coolant drainage, respectively, arranged in a swivel that is rotatably mounted in a free end of the rotor shaft.

2. A reactor according to claim 1, wherein the swivel is supported on a free end of the rotor shaft protruding from a gearbox, and the cooling channels in the rotor shaft extend from said free end to a region of insertion of the rotor shaft through the rear end wall of the reactor housing.

3. A reactor according to claim 2, wherein the cooling channels of the rotor shaft are extended for cooling of a region of the rotor shaft which is sealed against the environment at the region of insertion of the rotor shaft through the rear end wall of the reactor housing.

4. A reactor for recovering or recycling of hydrocarbon products from hydrocarbon-containing materials, comprising:
   a cylindrical reactor housing extending axially between a rear end wall and a front end wall;
   a rotor rotatably arranged in the reactor housing and driven in rotation by means of a motor and a rotor shaft coaxially aligned with the reactor housing, wherein the rotor has rotor arms extending radially from the rotor shaft, wherein each rotor arm comprises a hammer pivotally journaled in an outer end of the rotor arm, wherein the rotor shaft is journalled in a reactor stand and extending cantilevered through the rear end wall of the cylindrical reactor housing with no support from the front end wall of the reactor housing;

an inlet to the reactor housing through which process material is fed radially or axially into the reactor housing;

a reactor gas outlet opening out centrally in the front end wall through which gasified hydrocarbon products are discharged axially from the reactor housing; and a residual material outlet opening out peripherally in the reactor housing through which residual solid process material is discharged from the reactor housing, wherein between a periphery of the rotor and an inside of the reactor housing there is a radial play of 2 to 8 cm, and wherein at least a portion of the rotor shaft between the motor and the rotor is formed with channels running in the longitudinal direction of the rotor shaft, said channels being in flow communication with a coolant, via inflow and return flow channels running in parallel in the rotor shaft, the channels being individually in flow communication with a coolant supply and a coolant drainage, respectively, arranged in a swivel that is rotatably mounted in a free end of the rotor shaft.

5. A reactor according to claim 4, wherein each of the hammers can pivot during rotation of the rotor between a retracted position towards the rotor arm to which the hammer is connected and a substantially radially outwardly extended position away from the rotor arm to which the hammer is connected, wherein a length of the rotor arm is dimensioned so that in the extended position of the hammer a radial distance of 3 to 6 cm remains between the hammer and the inside of the reactor housing.

6. A reactor according to claim 5, wherein the rotor arms are distributed one after the other in a helical formation along the rotor shaft, resulting in a surrounding agitated layer of non-fluidized finely ground material between the rotor and the inside of the reactor housing.

7. A method for recovering or recycling of hydrocarbon products from hydrocarbon-containing materials using a reactor for recovering or recycling of hydrocarbon products from hydrocarbon-containing materials, comprising:

a cylindrical reactor housing extending axially between a rear end wall and a front end wall;

a rotor rotatably arranged in the reactor housing and driven in rotation by means of a motor and a rotor shaft coaxially aligned with the reactor housing, wherein the rotor has rotor arms extending radially from the rotor shaft, wherein each rotor arm comprises a hammer pivotally journaled in an outer end of the rotor arm, wherein the rotor shaft is journalled in a reactor stand and extending cantilevered through the rear end wall of the cylindrical reactor housing with no support from the front end wall of the reactor housing;

an inlet to the reactor housing through which process material is fed radially or axially into the reactor housing;

a reactor gas outlet opening out centrally in the front end wall through which gasified hydrocarbon products are discharged axially from the reactor housing; and a residual material outlet opening out peripherally in the reactor housing through which residual solid process material is discharged from the reactor housing, wherein between the periphery of the rotor and the inside of the reactor housing there is formed a radial play of 2 to 8 cm, wherein at least a portion of the rotor shaft between the motor and the rotor is formed with channels running in the longitudinal direction of the rotor shaft, said channels being in flow communication with a coolant, via inflow and return flow channels running in parallel in the rotor shaft, the channels being individually in flow communication with a coolant supply and a coolant drainage, respectively, arranged in a swivel that is rotatably mounted in a free end of the rotor shaft, and wherein said method comprises:

generating and maintaining an agitated layer of non-fluidized finely ground material surrounding the reactor rotor, said layer having a radial extension of at least 2 to 8 cm between the rotor and the inside of the reactor housing.

8. A method according to claim 7, wherein the rotor is helical in shape and the rotor arms are distributed one after the other in a helical formation along the rotor shaft, wherein the method further comprises driving the rotor in rotation in order to generate and maintain, by means of rotor arm tips evenly distributed over the periphery of the rotor, a particle layer of substantially homogeneous radial depth surrounding the rotor.

* * * * *